(12) United States Patent
Sawatzky

(10) Patent No.: US 6,588,774 B2
(45) Date of Patent: Jul. 8, 2003

(54) SKI PATROL TOBOGGAN

(76) Inventor: Randal G. Sawatzky, #103 - 2689 Kyle Road, Westbank, British Columbia (CA), V1Z 2M9

( * ) Notice: Subject to any disclaimer, the term of this patent is extended or adjusted under 35 U.S.C. 154(b) by 0 days.

(21) Appl. No.: 09/759,196

(22) Filed: Jan. 16, 2001

(65) Prior Publication Data

US 2001/0030401 A1 Oct. 18, 2001

Related U.S. Application Data

(60) Provisional application No. 60/176,495, filed on Jan. 18, 2000.

(51) Int. Cl.$^7$ ............................................. B62B 13/06
(52) U.S. Cl. ........................................... 280/24; 280/18
(58) Field of Search ................................ 280/18, 14.27, 280/18.1, 19, 24, 845

(56) References Cited

U.S. PATENT DOCUMENTS

| | | | | |
|---|---|---|---|---|
| 2,770,465 A | * | 11/1956 | Dandurand | 280/18 |
| 3,034,799 A | * | 5/1962 | Conover | 280/18 |
| 3,202,437 A | * | 8/1965 | Masbruch | 280/18 |
| 3,222,080 A | * | 12/1965 | Kinraide | 280/18 |
| 3,294,410 A | * | 12/1966 | Tomasino, Jr. | 280/18 |
| 3,455,571 A | * | 7/1969 | Dallera et al. | 208/18 |
| 5,306,026 A | | 4/1994 | Jesse | |
| 6,310,551 B1 | * | 10/2001 | Croft | 280/18 |

* cited by examiner

Primary Examiner—Avraham Lerner
(74) Attorney, Agent, or Firm—Antony C. Edwards

(57) ABSTRACT

The rescue toboggan of the present invention includes at least one hook arm mounted generally medially along the length of the toboggan. The hook arm extends away from the toboggan and has a rigid cantilevered member cantileverable over the toboggan so as to engage a portion of a chair lift underneath the cantilevered member, between the cantilevered member and the toboggan so that lifting translation of the chair lift causes corresponding lifting translation of the toboggan.

29 Claims, 7 Drawing Sheets

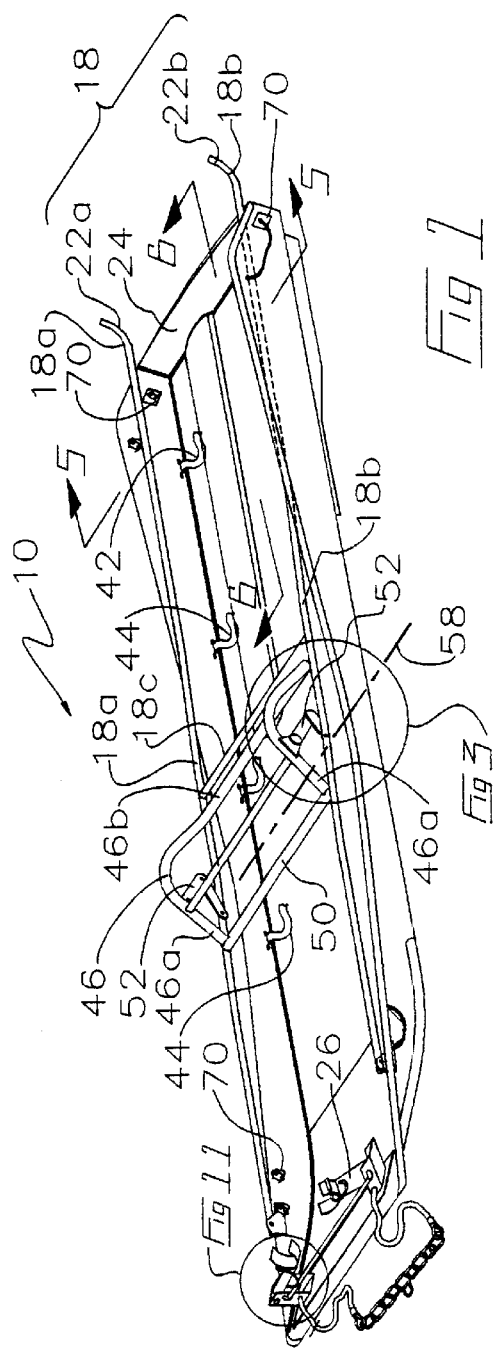
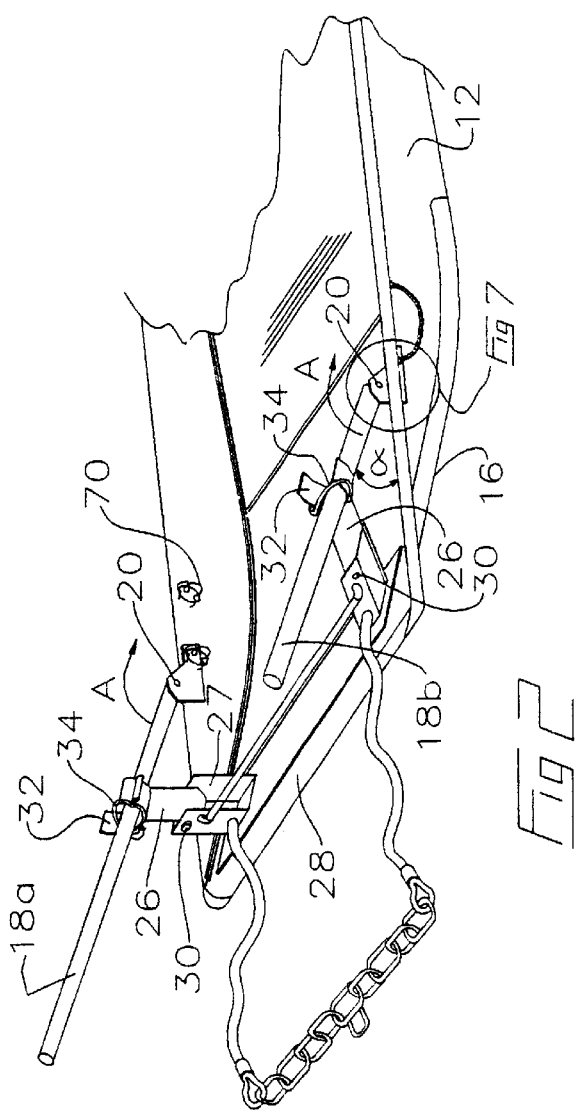

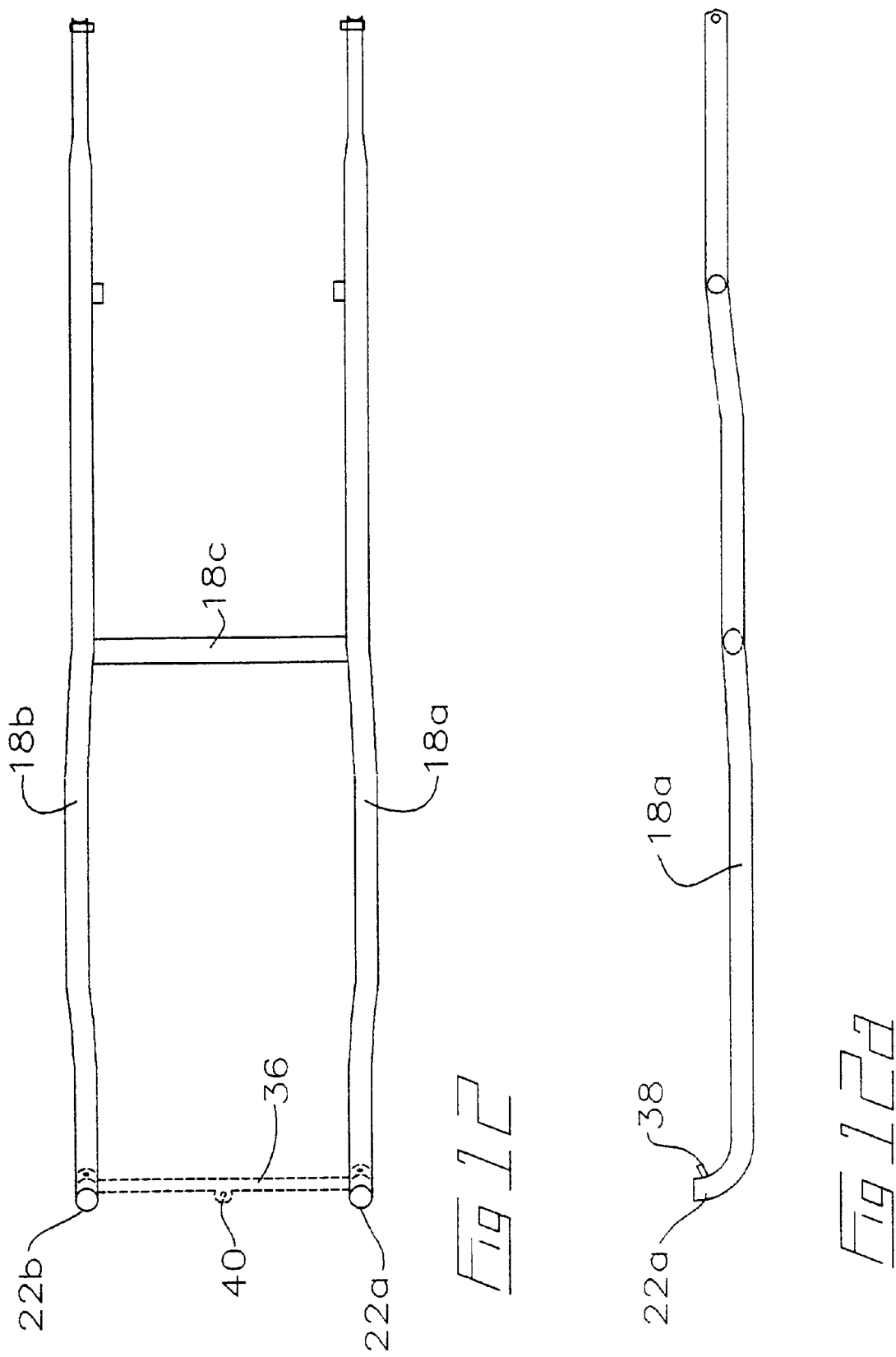

SKI PATROL TOBOGGAN

CROSS REFERENCE TO RELATED APPLICATION

This application claims priority from U.S. Provisional Patent Application No. 60/176,495 filed Jan. 18, 2000 titled Ski Patrol Toboggan.

FIELD OF THE INVENTION

This invention relates to the field of toboggan used by ski patrols to evacuate an injured person from a mountainside.

BACKGROUND OF THE INVENTION

Downhill skiing and snowboarding involves risk of injury. Typically a ski resort or the like provide assistance and first aid services administered by trained "ski patrol" personnel. When a skier or snowboarder is injured, ski patrol personnel attend at the scene of the accident and at their first safe opportunity evacuate the injured person from the mountain or ski hill for later treatment in hospital if necessary.

An injured person is typically evacuated by the use of a toboggan. The toboggan may have shallow sides and be sufficiently long so that the injured person may be laid prone within the toboggan. The toboggan may have a generally parallel pivotally mounted pair of rigid handles which may be pivoted so as to extend the handles from one end of the toboggan allowing a ski patrol attendant to hold the handles while standing and skiing between the handles. In this fashion, the descent of the toboggan may be controlled. Additionally, other ski patrol personnel may use guide cables, for example extending in a V-shape from the toboggan, so as to assist in controlling the descent of the toboggan.

It is quite often necessary to send a toboggan uphill mounted onto a ski lift chair on available ski lift facilities. In the prior art, such mounting has been difficult, often requiring a separate mounting apparatus affixed to the ski chair, the use of such apparatus made cumbersome by the often inclement conditions.

SUMMARY OF THE INVENTION

In summary, the rescue toboggan of the present invention includes at least one hook arm mounted generally medially along the length of the toboggan. The hook arm extends away from the toboggan and has a rigid cantilevered member cantileverable over the toboggan so as to engage a portion of a chair lift underneath the cantilevered member, between the cantilevered member and the toboggan so that lifting translation of the chair lift causes corresponding lifting translation of the toboggan.

The toboggan may have a pair of pivoting handles pivotally mounted thereto. The hook arm may be mounted to at least one of the handles. The hook arm may be pivotally mounted to the handles, one hook per handle, or for example, a single hook arm extending between the handles, so that the cantilevered member is pivotable between a lowered stowed position and an extended position operatively cantilevered and spaced apart from the handles. The hook arm may be U-shaped and the opposite ends of the U-shape may be pivotally mounted to opposite handles of the pair of pivoting handles.

The pair of pivoting handles are pivotally mounted at ends thereof at a first end of the toboggan. Distal ends of the handles are adjacent an opposite second end of the toboggan when the handles are pivoting so as to lay generally flush along the toboggan. The distal ends of the handles are laterally spaced apart sufficiently to allow a user to stand between the distal ends while holding the distal ends.

The hook arm may be mounted to the toboggan so as to align the cantilevered member over a center of gravity of the toboggan for stable lifting translation of the toboggan by the chair lift. The cantilevered member may be adapted to fit over a seat portion of the chair lift.

The hook arm may include a support member rigidly mounted at one end thereof to the cantilevered member, and at an opposite end pivotally mounted to the toboggan. The support member spaces the cantilevered member over the toboggan so as to engage the cantilevered member over the chair lift seat when the toboggan is stationary on a chair lift loading ramp and the chair lift seat is translated over the loading ramp so as to slide under the cantilevered member into abutting engagement abutted against the support member.

The distal ends of the handles may be releasably lockable to the second end of the toboggan by a first releasable fastener. The cantilevered member when in the stowed position may be releasably locked to the handles by a second releasable fastener. The first releasable fastener may be a patient restraining belt mounted in the toboggan. The second releasable fastener may be a resilient cord.

BRIEF DESCRIPTION OF THE DRAWINGS

FIG. 1 is, in perspective view, the toboggan of the present invention with the handles in their folded down and stowed position.

FIG. 2 is, in enlarged partially cut-away view, the toboggan of FIG. 1 with the handles in their deployed position.

FIG. 12 is, in plan view, the toboggan handles of FIG. 1.

FIG. 12a is, in side elevation view, the toboggan handles of FIG. 12.

DETAILED DESCRIPTION OF PREFERRED EMBODIMENTS

Figure 7:
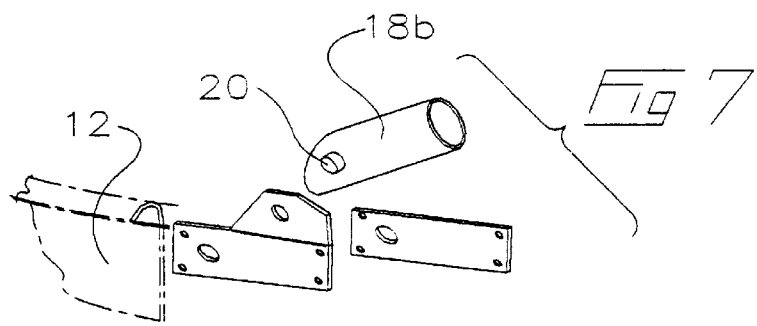
FIG. 7 is, in partially cut-away exploded perspective view, the pivot mounting plates for mounting of the handles to the sides of the toboggan of FIG. 2.
Figure 8:
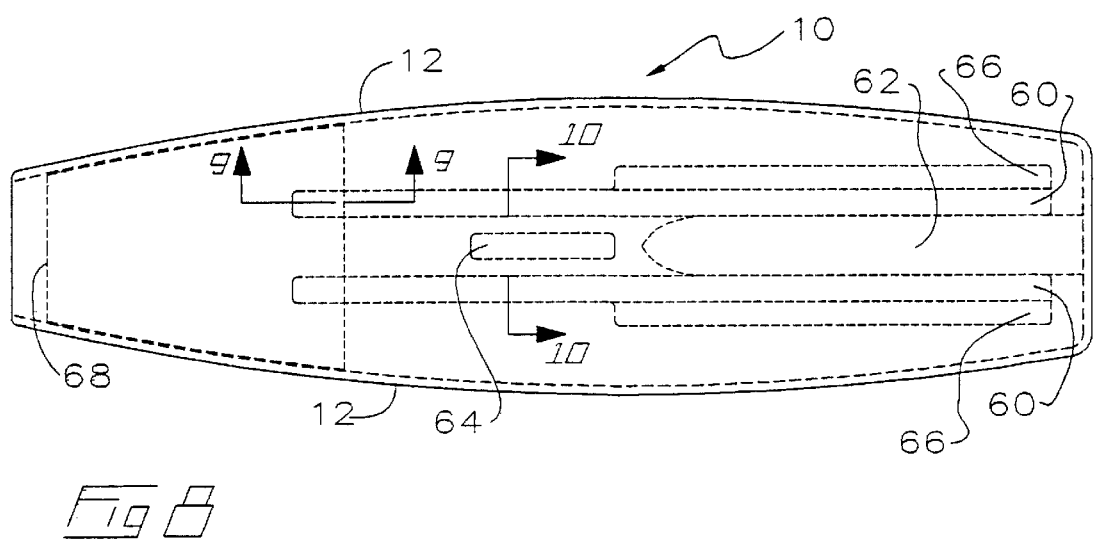
FIG. 8 is, in plan view, the interior lower surface of the toboggan of FIG. 1.
Figure 9:
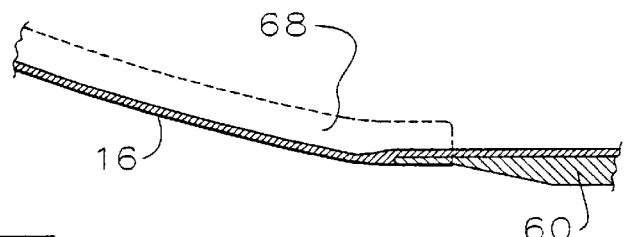
FIG. 9 is a cross-sectional view along line 9—9 in FIG. 8.

As seen in FIG. 1, toboggan 10 may be a conventionally shaped toboggan having sides 12, a lower surface 14 and an upturned front surface 16. A pair of generally parallel handles 18, respectively handles 18a and 18b, are pivotally mounted to corresponding sides 12 for example by pins 20 as better seen in FIG. 7. Handles 18, better seen in FIGS. 12 and 12a, are spaced apart sufficiently so that a ski patrol attendant may stand between the handles and so grip the handles on either side while maneuvering the toboggan.

Figure 11:
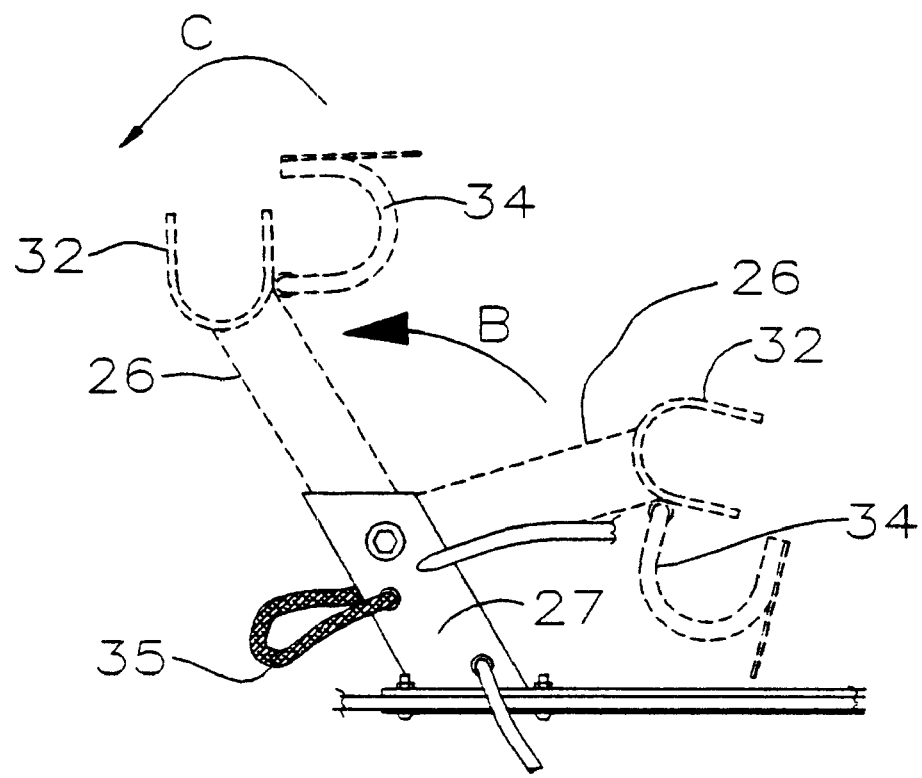
FIG. 11 is, in partially cut-away enlarged view, the pivotal mounting of the struts in their housings for supporting the handles in their deployed position of the toboggan of FIG. 1.
Figure 11A:
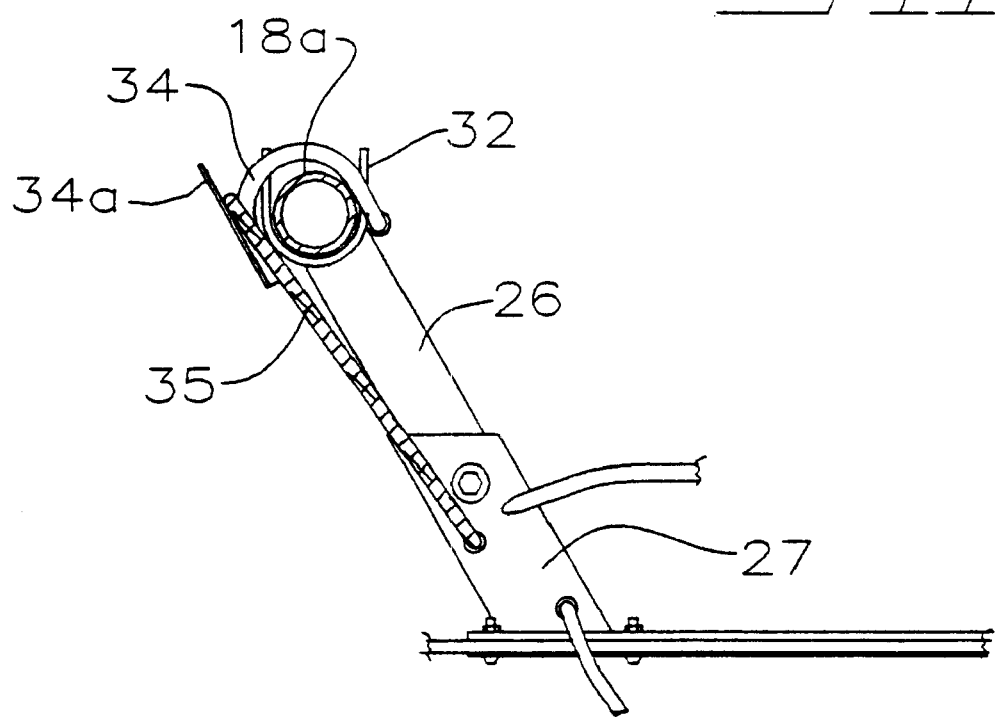
FIG. 11a is the view of FIG. 11 with the strut deployed and a handle locked therein.

Handles 18 may be pivoted in direction A from an operational position as seen in FIG. 2 into a storage position wherein the handles lay flush along the inside surfaces of sides 12. Stub ends 22a and 22b of handles 18a and 18b respectively terminate generally adjacent the rear 24 of the toboggan when the handles are in the storage position. The handles may be pivoted into their elevated operational position and releasably locked in that position by means of folding locking struts 26 so as to extend over the front end 28 of the toboggan. As better seen in FIGS. 11 and 11a, struts 26 are pivotally mounted in housing 27 to the interior surface front end 28 by means of pins or bolts 30. Thus struts 28 may be folded in direction B from the lowered storage position of FIG. 1 to the elevated position of FIGS. 2 and 11a wherein handles 18a and 18b may be supported within collars 32 mounted on the ends of struts 26. Locking arms 34 are pivotally mounted to one side of their respective collars 32 so that, with handles 18 nested within collars 32, locking arms 34 may be pivoted in direction C so as to lock the handles within the collars. Resilient cords 35 mounted to housings 27 so as to form loops may be used to hook over protruding arms 34a on locking arms 34 to releasably lock them over the handles. The handles are thus locked at an operative angle α relative to the toboggan for their use as described above.

The stub ends 22a and 22b of the handles may have a rigid yoke member 36 releasably mounted between the handles by means of pins 38. A flange 40 is rigidly mounted at the center of the length of yoke member 36. A hole in flange 40 provides a mounting point for example for use when it is desired to pull or lower the toboggan using lines instead of using handles 18 directly.

When handles 18 are in their folded-down storage position within toboggan 10, the handles may be retained in that position by use of releasable belt 42 or other releasable fastener. Belt 42 may be coupled across the handles and snugged down onto the handles in the manner of a lap belt. Belt 42 may be one of an array of patient restraining belts 44 mounted spaced apart along the length of the interior of toboggan 10.

Figure 3:
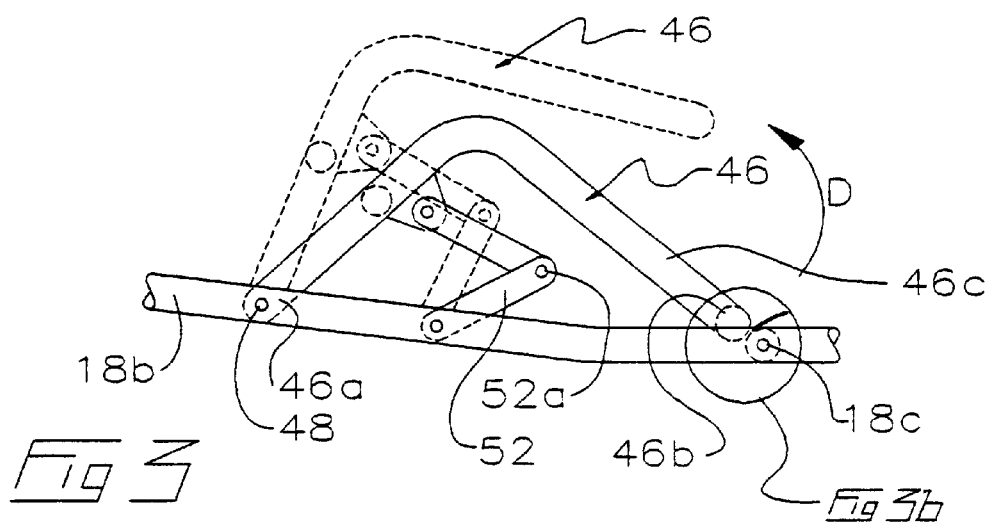
FIG. 3 is, in partially cut-away enlarged side elevation view, the U-shaped arm of FIG. 1.

U-shaped arm 46 is pivotally mounted to handles 18 by mounting one end of U-shaped arm 46 to each of handles 18a and 18b. In particular, as better seen in FIG. 3, U-shaped arm 46 is pivotally mounted at its ends 46a to handles 18a and 18b by means of pins 48 or for example by means of a shaft journalled through cross member 50. U-shaped arm 46 may be rigidly mounted to cross member 50 so that rotation of U-shaped arm 46 in direction D from its folded-down stowed position to its operative extended position rotates U-shaped arm 46 and cross member 50 about the shaft or pins 48.

Figure 3B:
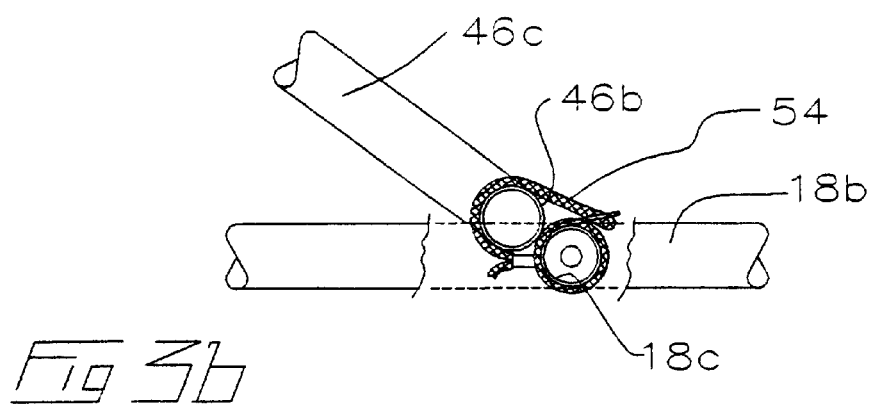
FIG. 3b is, in enlarged view, the fastening of the U-shaped arm to the handle cross member in FIG. 3.
Figure 3A:
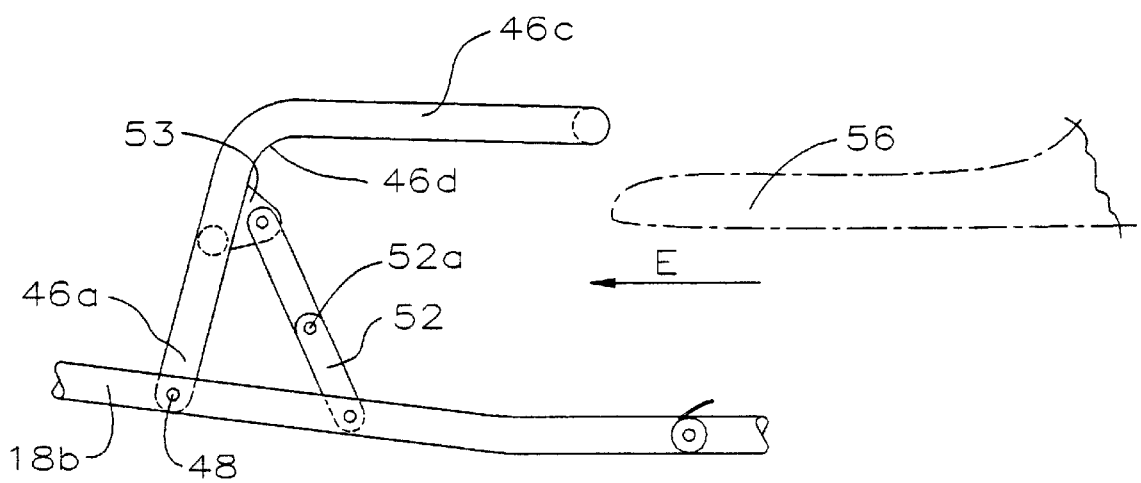
FIG. 3a is the view of FIG. 3 with the U-shaped arm in its deployed position.
Figure 5:
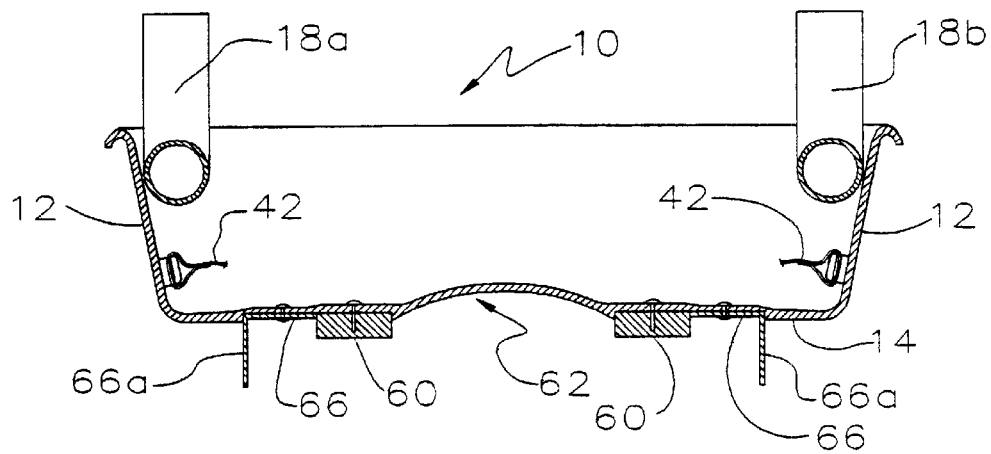
FIG. 5 is a cross-sectional view along line 5—5 in FIG. 1.

A pair of folding linkages 52 are mounted to U-shaped arm 46, one folding linkage 52 corresponding to each end 46a. Folding linkages 52 are pivotally mounted at one end to U-shaped arm 46, for example by means of rigid flange 53, and at their opposite end to handles 18a and 18b. Folding linkages 52 are bi-folded when U-shaped arm is folded-down into its stowed position. When U-shaped arm 46 is rotated in direction D into its operative extended position, folding linkages 52 unfold about their bi-fold joints 52a so as to limit the movement of U-shaped arm 46 about pins 48 once the folding linkages 52 are straightened as seen in FIG. 3a. In an alternative embodiment, an over-center releasable locking mechanism may be employed on folding linkages 52 so that, for example in the manner of folding table legs, U-shaped arm 46 may be releasably locked in its fully extendable position until it is desired by user to unlock folding linkages 52 to allow folding of the linkages and rotation of U-shaped arm 46 down into its stowed position.

Once in its stowed position, the cross-arm end 46b of U-shaped arm 46 may be releasably fastened or tethered to rigid cross member 18c which extends between handles 18a and 18b. End 46b may be releasably fastened or tethered to cross member 18c by means of a resilient cord 54 such as seen in FIG. 3b or by other releasable fasteners.

Rotation of U-shaped arm 46 relative to handles 18 allows U-shaped arm 46 to be either deployed so that intermediate portions 46c of arm 46 lie in a plane generally parallel to the floor of the toboggan, or folded down into the stowed position for storage in which end 46b of U-shaped arm 46 is adjacent to cross member 18c of handles 18.

When U-shaped arm 46 is deployed, intermediate portions 46c and end 46b are cantilevered over handles 18 so that intermediate portions 46c provide a laterally spaced apart pair of rigid cantilevered members generally parallel to and spaced apart from their corresponding handles 18. With handles 18 locked in their folded down storage position, the entire toboggan 10 may be mounted onto a chair lift seat using U-shaped arms 46 in their deployed position. In particular, a chair lift seat 56 is translated relative to toboggan 10 in direction E so as to slide the chair lift seat into the space between inner ends 46a and distal end 46b on U-shaped arm 46. Chair lift seat 56 is translated in direction E until the leading edge of the chair lift seat contacts the corresponding vertices 46d of U-shaped arm 46. The weight of the entire toboggan including handles, restraining belts, etc. may then be taken up by intermediate portions 46c of U-shaped arm 46 resting downwardly onto chair lift seat 56 for transport of toboggan 10 up the chair lift.

U-shaped arm 46 may be mounted to handles 18 so as to position center line 58 corresponding to the center of gravity of toboggan 10 below intermediate portions 46c of U-shaped arm 46 when in its extended position so that toboggan 10 is balanced when suspended from chair lift seat56, that is, when distal end 46b and intermediate portions 46c are hooked over the chair lift seat. Thus, when it is desired to uplift toboggan 10, an operator of a chair lift merely has to position toboggan 10 on the loading ramp with U-shaped arm 46 in its extended position and with the opening between distal end 46b and ends 46a directed towards an oncoming chair lift chair seat 56. Conventional movement in direction E of chair lift seat 56 across the loading ramp then hooks seat 56 into engagement with U-shaped arm 46. Toboggan 10 may then be uplifted to the top of the chair lift. At the top of the chair lift, the chair lift may then be slowed or stopped and toboggan 10 quickly removed by sliding U-shaped arm 46 away from seat 56 so as to remove the chair lift seat from between distal end 46b and ends 46a.

As seen in FIGS. 5, 6 and 8–10, the lower surface 14 of toboggan 10 may have longitudinally extending runners 60, for example a parallel pair of UHMW runners 60 in parallel spaced apart relationship rigidly mounted to lower surface 14. Runners 60 may extend rearwardly from upturned front surface 16 along the length of toboggan 10. A longitudinally extending concavity or tunnel 62 may extend between runners 60 along the length of a rear portion of lower surface 14.

Figure 4:
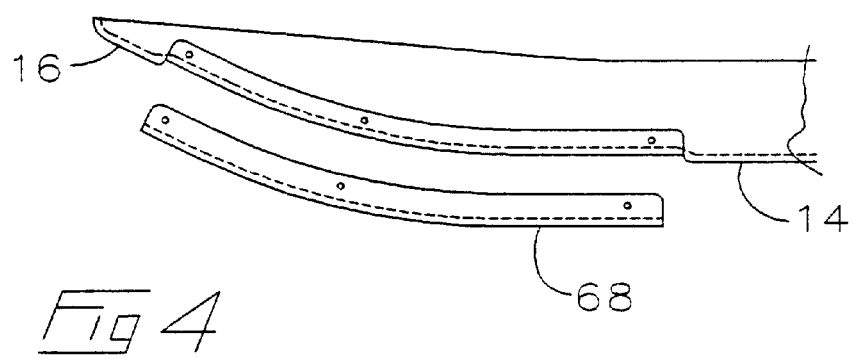
FIG. 4 is, in side elevation partially cut-away exploded view, the front of the toboggan of FIG. 1.
Figure 6:
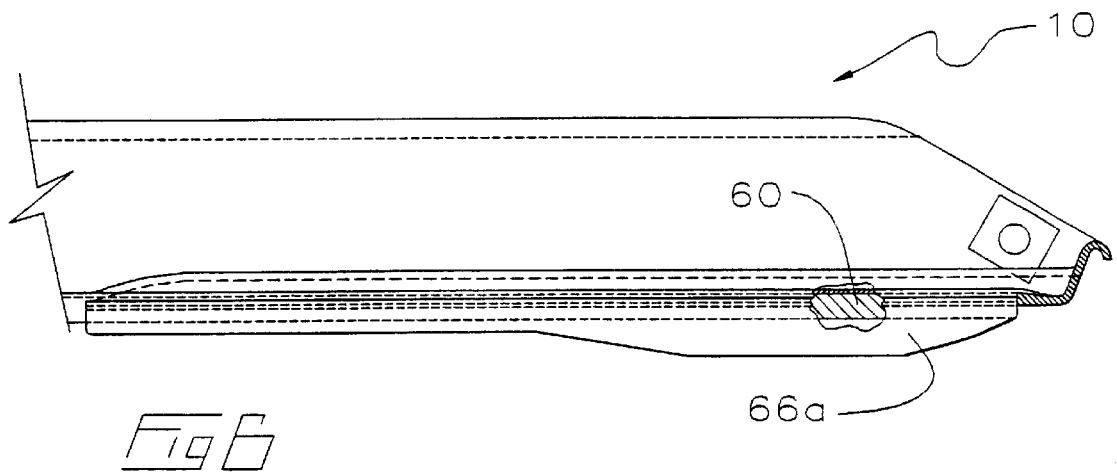
FIG. 6 is a cross-sectional view along line 6—6 in FIG. 1.
Figure 10:
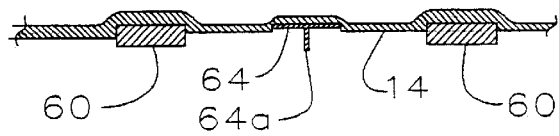
FIG. 10 is a cross-sectional view along line 10—10 in FIG. 8.

As seen in FIG. 10, a length of, for example, T-shaped rail 64 may be rigidly mounted along the longitudinal center-line of the toboggan, so as to intersect center-line 58. The lower leg 64a of rail 64 protrudes downwardly and is aligned with the longitudinal center-line. A pair of L-shaped rails 66 may be rigidly mounted parallel to, and aft of, rail 64 on either side of runners 60. The lower legs 66a of rails 66 protrude downwardly and may be formed as skegs at their aft ends such as seen in FIG. 6. The runners, rails and tunnel provide for tracking stability of the toboggan. As also seen in FIG. 4, a detachably mountable skid plate 68 may be mounted under front surface 16 for wear resistance. Hard points 70 may also be mounted around the sides and back of the toboggan to provide for mounting slings, lanyards, ropes, handles or the like.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A rescue toboggan comprising at least one hook arm mounted generally medially along the length of said toboggan, said at least one hook arm extending away from said toboggan and having a rigid cantilevered member cantileverable over said toboggan so as to engage a portion of a chair lift underneath said cantilevered member, between said cantilevered member and said toboggan so that lifting translation of said chair lift causes corresponding lifting translation of said toboggan, wherein said toboggan has a pair of pivoting handles pivotally mounted thereto and said at least one hook arm is mounted to at least one of said handles, wherein said at least one hook arm is pivotally mounted to said handles so that said cantilevered member is pivotable between a lowered stowed position and an extended position operatively cantilevered and spaced apart from said handles.

2. The toboggan of claim 1 wherein said at least one hook arm is a single hook arm extending between, and pivotally mounted to, said pair of pivoting handles.

3. The toboggan of claim 2 wherein said hook arm is U-shaped and the opposite ends of said U-shape are pivotally mounted to opposite handles of said pair of pivoting handles.

4. The toboggan of claim 3 wherein said pair of pivoting handles are pivotally mounted at ends thereof at a first end of said toboggan and distal ends of said handles are adjacent an opposite second end of said toboggan when said handles are pivoting so as to lay generally flush along said toboggan, said distal ends of said handles laterally spaced apart sufficiently to allow a user to stand between said distal ends while holding said distal ends.

5. The toboggan of claim 1 wherein said at least one hook arm is mounted to said toboggan so as to align said cantilevered member over a center of gravity of said toboggan for stable lifting translation of said toboggan by said chair lift.

6. A rescue toboggan comprising at least one hook arm mounted generally medially along the length of said toboggan, said at least one hook arm extending away from said toboggan and having a rigid cantilevered member cantileverable over said toboggan so as to engage a portion of a chair lift underneath said cantilevered member, between said cantilevered member and said toboggan so that lifting translation of said chair lift causes corresponding lifting translation of said toboggan, wherein said toboggan has a pair of pivoting handles pivotally mounted thereto and said at least one hook arm is mounted to at least one of said handles, wherein said cantilevered member is adapted to fit over a seat portion of said chair lift, wherein said at least one hook arm comprises a support member rigidly mounted at one end thereof to said cantilevered member, and at an opposite end pivotally mounted to said toboggan.

7. The toboggan of claim 6 wherein said support member spaces said cantilevered member over said toboggan so as to engage said cantilevered member over said seat when said toboggan is stationary on a chair lift loading ramp and said seat is translated over said loading ramp so as to slide under said cantilevered member into abutting engagement abutted against said support member.

8. The toboggan of claim 7 wherein said toboggan has a pair of pivoting handles pivotally mounted thereto and said at least one hook arm is mounted to at least one of said handles.

9. The toboggan of claim 8 wherein said at least one hook arm is pivotally mounted to said handles so that said cantilevered member is pivotable between a lowered stowed position and an extended position operatively cantilevered and spaced apart from said handles.

10. The toboggan of claim 9 wherein said at least one hook arm is a single hook arm extending between, and pivotally mounted to, said pair of pivoting handles.

11. The toboggan of claim 10 wherein said hook arm is U-shaped and the opposite ends of said U-shape are pivotally mounted to opposite handles of said pair of pivoting handles.

12. The toboggan of claim 11 wherein said pair of pivoting handles are pivotally mounted at ends thereof at a first end of said toboggan and distal ends of said handles are adjacent an opposite second end of said toboggan when said handles are pivoting so as to lay generally flush along said toboggan, said distal ends of said handles laterally spaced apart sufficiently to allow a user to stand between said distal ends while holding said distal ends.

13. The toboggan of claim 12 wherein said distal ends of said handles are releasably lockable to said second end of said toboggan by a first releasable fastener, and wherein said cantilevered member when in said stowed position is releasably lockable to said handles by a second releasable fastener.

14. The toboggan of claim 13 wherein said first releasable fastener is a patient restraining belt mounted in said toboggan.

15. The toboggan of claim 14 wherein said second releasable fastener is a resilient cord.

16. A rescue toboggan comprising at least one hook arm mounted generally medially along the length of said toboggan, said at least one hook arm extending away from said toboggan and having a rigid cantilevered member cantileverable over said toboggan so as to engage a portion of a chair lift underneath said cantilevered member, between said cantilevered member and said toboggan so that lifting translation of said chair lift causes corresponding lifting translation of said toboggan, wherein said toboggan has a pair of pivoting handles pivotally mounted thereto and said at least one hook arm is mounted to at least one of said handles so as to align said cantilevered member over a center of gravity of said toboggan for stable lifting translation of said toboggan by said chair lift, and wherein said cantilevered member is adapted to fit over a seat portion of said chair lift, wherein said at least one hook arm is pivotally mounted to said handles so that said cantilevered member is pivotable between a lowered stowed position and an extended position operatively cantilevered and spaced apart from said handles.

17. The toboggan of claim 16 wherein said at least one hook arm is a single hook arm extending between, and pivotally mounted to, said pair of pivoting handles.

18. The toboggan of claim 17 wherein said hook arm is U-shaped and the opposite ends of said U-shape are pivotally mounted to opposite handles of said pair of pivoting handles.

19. The toboggan of claim 18 wherein said pair of pivoting handles are pivotally mounted at ends thereof at a first end of said toboggan and distal ends of said handles are adjacent an opposite second end of said toboggan when said handles are pivoting so as to lay generally flush along said toboggan, said distal ends of said handles laterally spaced apart sufficiently to allow a user to stand between said distal ends while holding said distal ends.

20. The toboggan of claim 16 wherein said at least one hook arm comprises a support member rigidly mounted at one end thereof to said cantilevered member, and at an opposite end pivotally mounted to said toboggan.

21. The toboggan of claim 20 wherein said support member spaces said cantilevered member over said toboggan so as to engage said cantilevered member over said seat when said toboggan is stationary on a chair lift loading ramp and said seat is translated over said loading ramp so as to slide under said cantilevered member into abutting engagement abutted against said support member.

22. The toboggan of claim 21 wherein said toboggan has a pair of pivoting handles pivotally mounted thereto and said at least one hook arm is mounted to at least one of said handles.

23. The toboggan of claim 22 wherein said at least one hook arm is pivotally mounted to said handles so that said cantilevered member is pivotable between a lowered stowed position and an extended position operatively cantilevered and spaced apart from said handles.

24. The toboggan of claim 23 wherein said at least one hook arm is a single hook arm extending between, and pivotally mounted to, said pair of pivoting handles.

25. The toboggan of claim 24 wherein said hook arm is U-shaped and the opposite ends of said U-shape are pivotally mounted to opposite handles of said pair of pivoting handles.

26. The toboggan of claim 25 wherein said pair of pivoting handles are pivotally mounted at ends thereof at a first end of said toboggan and distal ends of said handles are adjacent an opposite second end of said toboggan when said handles are pivoting so as to lay generally flush along said toboggan, said distal ends of said handles laterally spaced apart sufficiently to allow a user to stand between said distal ends while holding said distal ends.

27. The toboggan of claim 26 wherein said distal ends of said handles are releasably lockable to said second end of said toboggan by a first releasable fastener, and wherein said cantilevered member when in said stowed position is releasably lockable to said handles by a second releasable fastener.

28. The toboggan of claim 27 wherein said first releasable fastener is a patient restraining belt mounted in said toboggan.

29. The toboggan of claim 28 wherein said second releasable fastener is a resilient cord.

* * * * *